Nov. 25, 1941.  W. G. HELTZEL ET AL  2,263,774
PIPE-LINE TOOL
Filed Jan. 27, 1939  2 Sheets-Sheet 1

Inventors:
William Gillum Heltzel
Arthur Miller Hill
By, Geo. L. Parkhurst
Attorney.

Patented Nov. 25, 1941

2,263,774

UNITED STATES PATENT OFFICE 2,263,774

PIPE-LINE TOOL

William Gillum Heltzel and Arthur Miller Hill, Tulsa, Okla., assignors to Stanolind Pipe Line Company, Tulsa, Okla., a corporation of Maine Application January 27, 1939, Serial No. 253,160

2 Claims. (Cl. 15—104.06)

This invention relates to pipe line scrapers and other pipe line tools.

It is an object of our invention to provide pipe line tools and particularly pipe line scrapers which can be used with increased speed and efficiency and which will do an improved job of removing deposits from the interior of a pipe line. Other and more detailed objects, advantages and uses of our invention will become apparent as the description thereof proceeds.

Our invention will be described further with reference to the accompanying drawings which illustrate certain embodiments of our invention and in which.

Figure 2:
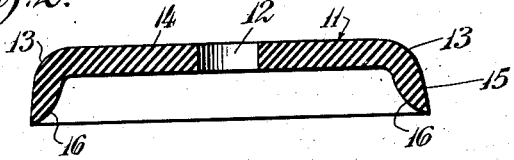
Figure 2 is a sectional elevation taken along the line 2—2 of Figure 1.
Figure 4:
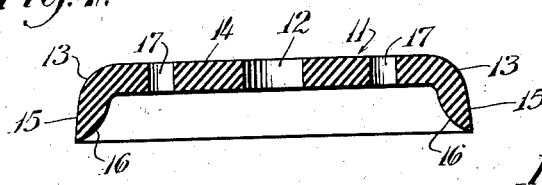
Figure 4 is a sectional elevation taken along the line 4—4 of Figure 3.

Turning now to the drawings in more detail, it will be seen that a cupped rubber disc 11 is provided with a central opening 12 which can be of any desired size and is for the purpose of mounting the disc on the central shaft of a pipe line tool. The outer diameter of the disc is slightly larger, preferably about $\frac{1}{16}$ inch larger, than the inner diameter of the pipe line on which it is to be used. The inner diameter of the pipe line in which the scraper is to be used is preferably about equal to the diameter of the disc between the points 13 on the outer surface of the disc located opposite the main body of the disc or, in other words, opposite the horizontal body portion 14 as shown in Figures 2 and 4. From this point the disc is cupped downwardly and outwardly so that a flaring skirt 15 is provided, the outer surface of which will bear tightly against the inside of the pipe line.

It will also be noted, as shown in Figures 2 and 4, that the lower inner portion 16 of the skirt of the disc is feathered to provide increased flexibility so that the differential pressure back of the disc (below it as shown in Figures 2 and 4) will force the lower edge into tight contact with the pipe.

Figure 1:
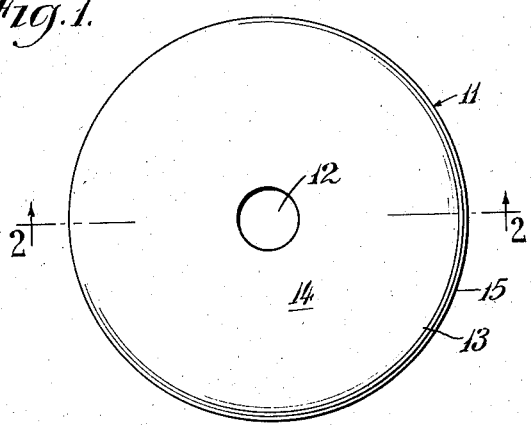
Figure 1 is a top plan view of a cupped rubber disc.
Figure 3:
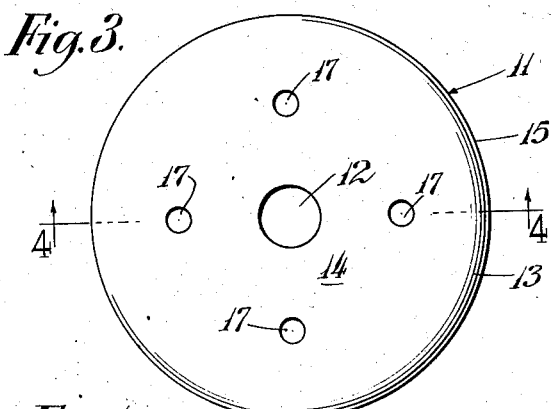
Figure 3 is a top plan view of a modified cupped rubber disc.

The cupped rubber disc shown in Figures 3 and 4 is identical with that of Figures 1 and 2 except that four grommet openings 17 are provided.

Figure 5:
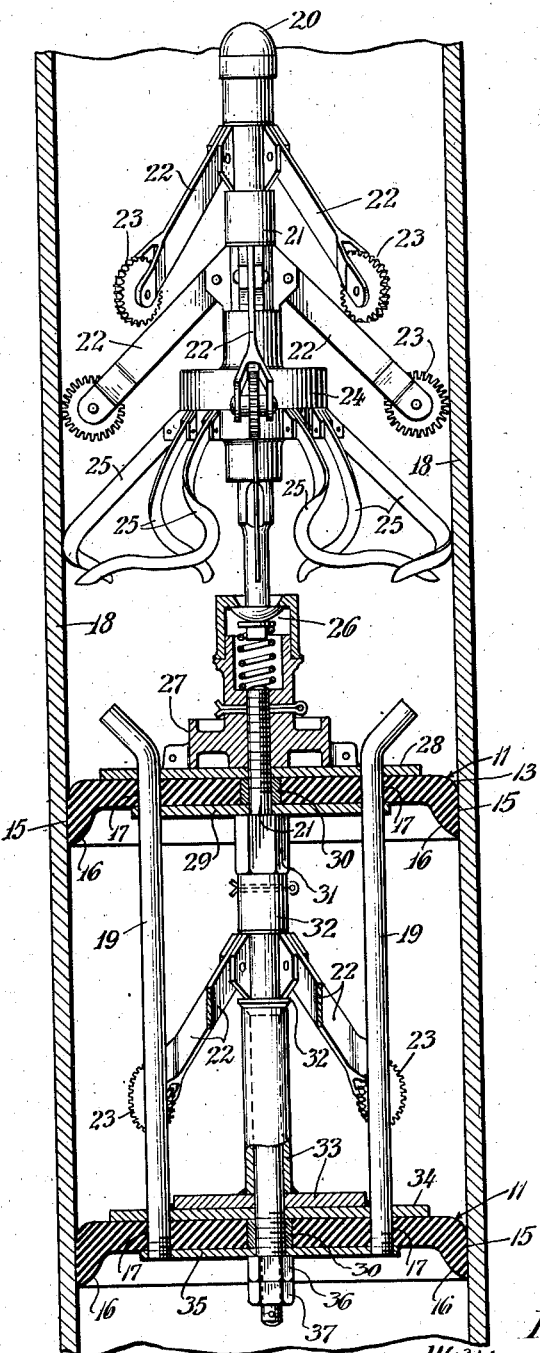
Figure 5 is a plan view, partly in section, of a pipe line containing a pipe line scraper equipped with two cupped rubber discs of the type shown in Figures 3 and 4.

Figure 5 shows a pipe line 18 containing a pipe line scraper which can also be used as a displacement tool. This tool is conventional except for the cupped rubber discs 11 (of the type shown in Figures 3 and 4), the grommet pipes 19 and the parts immediately associated with these discs and grommet pipes.

The tool has a nose 20 at its forward end which is followed by a shaft or head piece 21 on which are mounted two sets of guide arms 22 carrying toothed wheels 23, there being four guide arms and toothed wheels in each set. Each guide arm is urged outwardly by a spring (not shown) operating on the inner end of the arm. The two sets of guide arms and toothed wheels are arranged 45° out of line with each other. The main purpose of the toothed wheels 23 is to provide a guide to prevent the main body of the tool from rotating freely within the pipe line 18.

Back of the portion carrying the toothed wheels is an enlarged hub 24 carrying a large number, for instance eight, scrapers 25 to remove deposits from the interior of the pipe line. These scrapers are also outwardly urged by springs not shown. Back of the scraper portion of the device is a flexible joint 26 and back of it is a spider 27 on which is mounted a driver head disc 28 for the front cupped rubber disc 11. This driver head disc 28 is equipped with four holes for the reception of grommet pipes 19. The front cupped rubber disc 11 is held between driver head disc 28 and a rear driver head disc 29 and is mounted on shaft 21 with the aid of disc bushing 30. These elements are held in place by means of sub stud 31. In back of sub stud 31 is a rear guide arm head piece 32 on which is mounted a set of four rear guide arms 22 carrying toothed wheels 23 similar to those on the front of the scraper.

To the rear of this toothed wheel member a driver head and sleeve 33 is mounted on the rear guide arm head piece 32 and cooperates with driver head disc 34 which, like driver head discs 28 and 29, is equipped with four holes for the passage of grommet pipes 19. Between this driver head disc 34 and a rear driver head disc 35, tapped to receive the threaded ends of grommet pipes 19, is mounted the rear cupped rubber disc 11 which is mounted on head piece 32 by means of a disc bushing 30. The two driver heads associated with the rear rubber disc are held in place by nut 36 and lock nut 37.

Through the various driver heads and cupped rubber discs pass grommet pipes 19 which are outwardly directed at their front ends after passing through front rubber disc 11. These grommet pipes are arranged so that each one passes between two of the rear set of guide arms 22 carrying toothed wheels 23.

The purpose of the grommet pipes is to allow a limited amount of oil (or other pumping fluid) to by-pass from behind the scraper to the space in front of it and thereby flush out accumulations of wax and other solids scraped from the inside wall of the pipe 18 by the scraper knives 25 in passing through the line. Such accumulations, if not properly mixed with the oil stream, sometimes pack solid in front of the scraper and plug the line.

In traveling through the pipe line, the pressure ahead of the scraper is lower than that behind it by an amount equal to the pressure required to propel the scraper (for instance between 20 and 30 pounds per square inch). The pressure present between the discs is midway between the pressures ahead and behind the scraper. These pressure differentials make it possible for oil to flow through the grommet pipes in the discs with considerable velocity.

Formerly individually bushed holes were placed in each disc without connecting tubes to carry the small streams of oil directly through the space between the discs. Consequently, the velocity of the jets of oil through the holes in the rear disc was lost in entering the large space between the discs. As a result the velocity of the jets coming through the holes in the front disc was much less than could reasonably be expected from the pressure differential around the scraper.

In the improved installation, shown in Figure 5, ⅜ inch grommet pipes 19 carry the small streams directly from the rear to the front of the two discs, and the full pressure differential is utilized in increasing the velocity of the jets of oil. Thus a more efficient action is obtained for stirring up and flushing out accumulations of paraffin and other impurities which would otherwise plug the pipe line and stop the passage of the scraper.

The type of pipe line scraper shown in Figure 5 is a modified Northrup type but it will be apparent that the cupped rubber discs and grommet pipes of our invention can readily be used in connection with other types of scrapers and other pipe line tools. In general the appended claims are to be construed as broadly as the prior art will permit.

We claim:

1. In a pipe line tool, two spaced propulsive discs and a plurality of grommet pipes passing through said discs and extending from the rear disc to the front disc, whereby flushing of deposits accumulating ahead of said discs is accomplished.

2. In a pipe line tool, two spaced propulsive discs and a plurality of grommet pipes passing through said discs and extending from the rear disc to the front disc, said pipes being outwardly directed at the front end, whereby flushing of deposits accumulating ahead of said discs is accomplished.

WILLIAM GILLUM HELTZEL.
ARTHUR MILLER HILL.